US012424364B2

(12) United States Patent
Hamachi et al.

(10) Patent No.: US 12,424,364 B2
(45) Date of Patent: Sep. 23, 2025

(54) MULTILAYER COIL COMPONENT

(71) Applicant: TDK CORPORATION, Tokyo (JP)

(72) Inventors: Noriaki Hamachi, Tokyo (JP); Toshinori Matsuura, Tokyo (JP); Junichiro Urabe, Tokyo (JP); Kazuya Tobita, Tokyo (JP); Yuto Shiga, Tokyo (JP); Youichi Kazuta, Tokyo (JP); Yuichi Takubo, Tokyo (JP); Shunya Suzuki, Tokyo (JP); Xuran Guo, Tokyo (JP); So Kobayashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 595 days.

(21) Appl. No.: 17/953,549

(22) Filed: Sep. 27, 2022

(65) Prior Publication Data

US 2023/0104422 A1 Apr. 6, 2023

(30) Foreign Application Priority Data

Sep. 29, 2021 (JP) ................................. 2021-158892

(51) Int. Cl.
*H01F 5/04* (2006.01)

(52) U.S. Cl.
CPC ...................................... *H01F 5/04* (2013.01)

(58) Field of Classification Search
CPC ............................... H01F 5/04; H01F 17/0013
See application file for complete search history.

(56) References Cited

U.S. PATENT DOCUMENTS

| | | | | |
|---|---|---|---|---|
| 11,469,034 | B2 * | 10/2022 | Mizukami | H01F 27/2847 |
| 2015/0371753 | A1 * | 12/2015 | Lee | H01F 27/292 336/200 |
| 2017/0186526 | A1 * | 6/2017 | Kim | H01F 27/292 |
| 2018/0068780 | A1 * | 3/2018 | Shimoda | H01F 17/0013 |

FOREIGN PATENT DOCUMENTS

| | | | | | |
|---|---|---|---|---|---|
| JP | H11273954 | A | * | 10/1999 | |
| JP | 2000058325 | A | * | 2/2000 | |
| JP | 2018-50022 | A | | 3/2018 | |
| JP | 2018050022 | A | * | 3/2018 | H01F 17/0013 |

* cited by examiner

*Primary Examiner* — Malcolm Barnes
(74) *Attorney, Agent, or Firm* — Oliff PLC

(57) ABSTRACT

In a multilayer coil component, a coil is disposed in an element body. The coil includes a plurality of coil conductors. The plurality of coil conductors include first, second, and third end portions. The first, second, and third end portions are exposed from the element body on a first surface and connected to a first external electrode. The first, second, and third end portions are arranged in order in a first direction when viewed from a second direction along the first surface and orthogonal to the first direction. The first end portion and the third end portion overlap each other when viewed from the first direction at least in part. Each of the first end portion and the third end portion has a region not overlapping the second end portion when viewed from the first direction.

10 Claims, 9 Drawing Sheets

MULTILAYER COIL COMPONENT

TECHNICAL FIELD

The present invention relates to a multilayer coil component.

BACKGROUND

A known multilayer coil component includes an element body, a coil disposed in the element body, and a pair of external electrodes electrically connected to each other via the coil (for example, Japanese Unexamined Patent Publication No. 2018-050022). The element body includes first and second surfaces. The coil includes a plurality of coil conductors electrically connected to each other. The pair of external electrodes include a first external electrode provided on the first surface and a second external electrode provided on the second surface. The plurality of coil conductors include a plurality of end portions exposed from the element body on the first surface and connected to the first external electrode. These end portions are lined up in a first direction when viewed from a second direction along the first surface and orthogonal to the first direction.

As described above, it is considered to provide the plurality of end portions electrically connected to each other in the multilayer coil component. In this case, the direct current resistance of the coil configured by the plurality of coil conductors can be reduced. However, in a case where the plurality of end portions overlap when viewed from the first direction, a current passing through each end portion may result in a proximity effect and the characteristics of the multilayer coil component may deteriorate. For example, the magnetic field generated by the current flowing through one end portion may affect the current flowing through the other end portion. In a case where the plurality of end portions overlap when viewed from the first direction, stray capacitance may be generated in the end portions and the self-resonant frequency (SRF) may decline due to the stray capacitance.

In order to suppress the harmful effect of the plurality of end portions being close to each other as described above, it is conceivable to keep a distance between the end portions. However, as the distance between the end portions increases in the first direction, it is difficult to make the multilayer coil component compact. As the distance between the end portions increases in the second direction, the current path difference between the coil conductors including the end portions increases. A large current path difference between the coil conductors may result in a decline in multilayer coil component characteristics. For example, as the current path difference between the coil conductors increases, the direct current resistance in the coil conductors increases. Accordingly, the characteristics of the entire multilayer coil component may change depending on the current path difference between the coil conductors.

SUMMARY

An object of one aspect of the present invention is to provide a multilayer coil component in which desired characteristics can be easily realized in a compact configuration.

A multilayer coil component in one aspect of the present invention includes an element body, a coil, and a pair of external electrodes. The element body includes first and second surfaces. The coil is disposed in the element body. The coil includes a plurality of coil conductors. The plurality of coil conductors are stacked in a first direction and electrically connected to each other. The pair of external electrodes are separated from each other and disposed on an outer surface of the element body. The pair of external electrodes are electrically connected to each other via the plurality of coil conductors. The pair of external electrodes include a first external electrode and a second external electrode. The first external electrode is provided on the first surface. The second external electrode is provided on the second surface. The plurality of coil conductors are exposed from the element body on the first surface and connected to the first external electrode. The plurality of coil conductors include first, second, and third end portions. The first, second, and third end portions are arranged in order in the first direction when viewed from a second direction along the first surface and orthogonal to the first direction. The first end portion and the third end portion overlap each other when viewed from the first direction at least in part. Each of the first end portion and the third end portion has a region not overlapping the second end portion when viewed from the first direction.

In this multilayer coil component, the first end portion and the third end portion overlap each other when viewed from the first direction at least in part. Accordingly, the multilayer coil component can be made compact and the current path difference between the coil conductors can also be reduced. Desired characteristics can be easily ensured on condition that the current path difference between the coil conductors is reduced. Since the first end portion and the third end portion respectively have the regions not overlapping the second end portion when viewed from the first direction, the proximity effect attributable to a current passing through the end portions and the generation of stray capacitance in the end portions can be suppressed. Accordingly, desired characteristics can be easily realized in a compact configuration.

In the above aspect, the second end portion may include a region not overlapping the first end portion and a region not overlapping the third end portion when viewed from the first direction. In this case, the proximity effect between the first and third end portions and the second end portion and the stray capacitance in the second end portion can be further reduced.

In the above aspect, the second end portion may have a region not overlapping both the first end portion and the third end portion when viewed from the first direction. In this case, the multilayer coil component can be configured such that the region where the first end portion and the third end portion overlap when viewed from the first direction is relatively large. Accordingly, the multilayer coil component can be made compact and the variation in the current path of the coil conductor can be reduced. Desired characteristics can be more easily ensured on condition that the variation in the current path of the coil conductor is reduced.

In the above aspect, the plurality of coil conductors may include a first coil conductor, a second coil conductor, and a third coil conductor. The first coil conductor may include the first end portion. The second coil conductor may include the second end portion. The third coil conductor may include the third end portion. Lengths of current paths of the first and third coil conductors may be shorter than a length of a current path of the second coil conductor. In this case, of the first, second, and third end portions, the current paths of the first and third end portions are reduced as compared with the current path of the second end portion. Accordingly, the direct current resistance of the plurality of coil conductors including the first, second, and third end portions can be further reduced.

In the above aspect, the first coil conductor may linearly extend in a third direction intersecting the first and second directions from a connecting part where the first coil conductor and the first external electrode are connected. In this case, the current path of the first end portion can be configured to be shortest.

In the above aspect, the coil may have a coil axis extending in the first direction. A shortest distance between the second end portion and the coil axis may be smaller than a shortest distance between the first end portion and the coil axis in the second direction. In this case, the disposition space of the second end portion can be ensured while the multilayer coil component is made compact.

In the above aspect, each of the first end portion and the third end portion may not overlap the second end portion when viewed from the first direction. In this case, the proximity effect between the first and third end portions and the second end portion and the stray capacitance in the second end portion can be further reduced.

In the above aspect, the plurality of coil conductors may include a first conductor group and a second conductor group. The first conductor group may include a plurality of end portions exposed from the element body on the first surface and connected to the first external electrode. The second conductor group may include one or more end portions exposed from the element body on the second surface and connected to the second external electrode. The first conductor group may include the first end portion, the second end portion, and the third end portion. The number of the end portions included in the second conductor group may be smaller than the number of the end portions included in the first conductor group. In this case, a desired magnetic path length can be ensured by the configuration in which the number of the end portions included in the second conductor group is different from the number of the end portions included in the first conductor group. Since the number of the end portions included in the second conductor group is smaller than the number of the end portions included in the first conductor group, the proximity effect in the second conductor group and the effect of stray capacitance can be easily reduced.

In the above aspect, the number of the end portions in the second conductor group may be one. In this case, since the end portion in the second conductor group is one in number, no proximity effect occurs in the second conductor group and the effect of stray capacitance in the end portion can also be further reduced.

In the above aspect, the plurality of coil conductors may further include a fourth end portion. The fourth end portion may be exposed from the element body on the first surface and connected to the first external electrode. The first, second, third, and fourth end portions may be arranged in order in the first direction when viewed from the second direction. The second end portion and the fourth end portion may overlap each other in the first direction at least in part. Each of the second end portion and the fourth end portion may have a region not overlapping the third end portion when viewed from the first direction. In this case, compactness is achieved and desired characteristics can be easily realized even if four or more end portions are exposed from the element body on the first surface.

One aspect of the present invention provides a multilayer coil component in which desired characteristics can be easily realized in a compact configuration.

DETAILED DESCRIPTION

Figure 1:
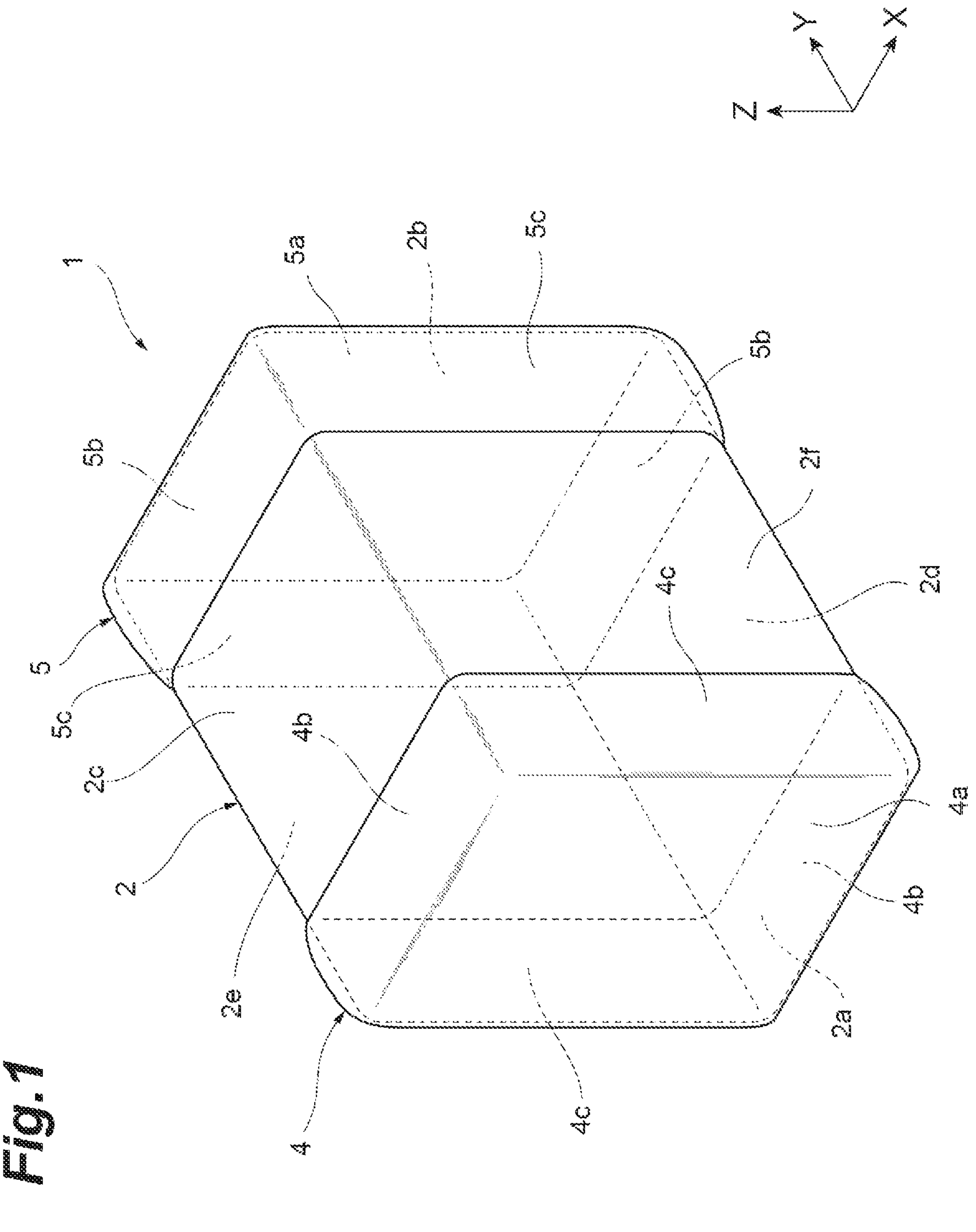
FIG. 1 is a perspective view of a multilayer coil component in the present embodiment.

Hereinafter, an embodiment of the present invention will be described in detail with reference to the accompanying drawings. In the description of the drawings, the same reference numerals are used for the same or equivalent elements with redundant description omitted.

Figure 2:
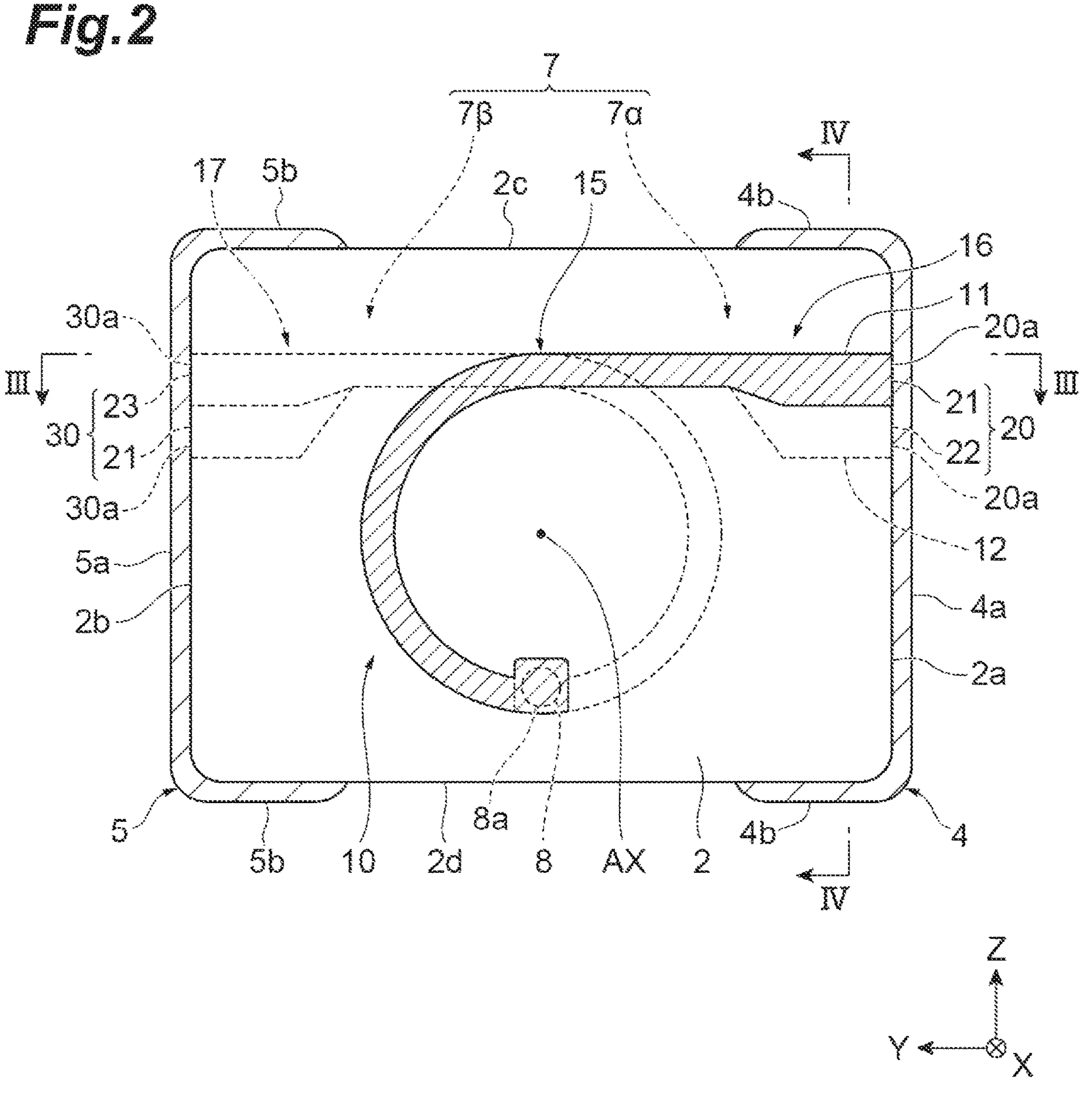
FIG. 2 is a cross-sectional view of the multilayer coil component taken along line II-II.
Figure 3:
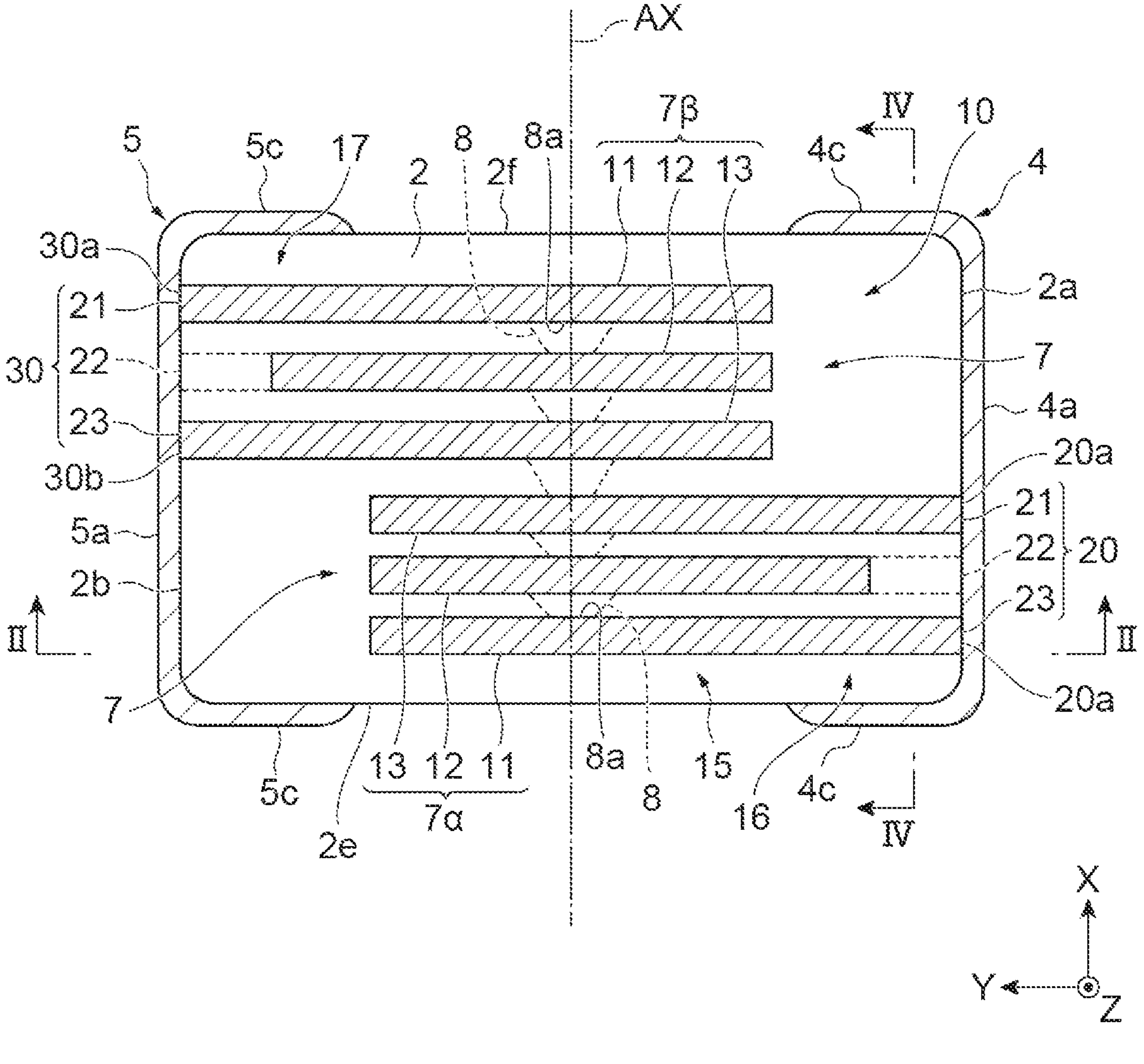
FIG. 3 is a cross-sectional view of the multilayer coil component taken along line III-III.
Figure 4:
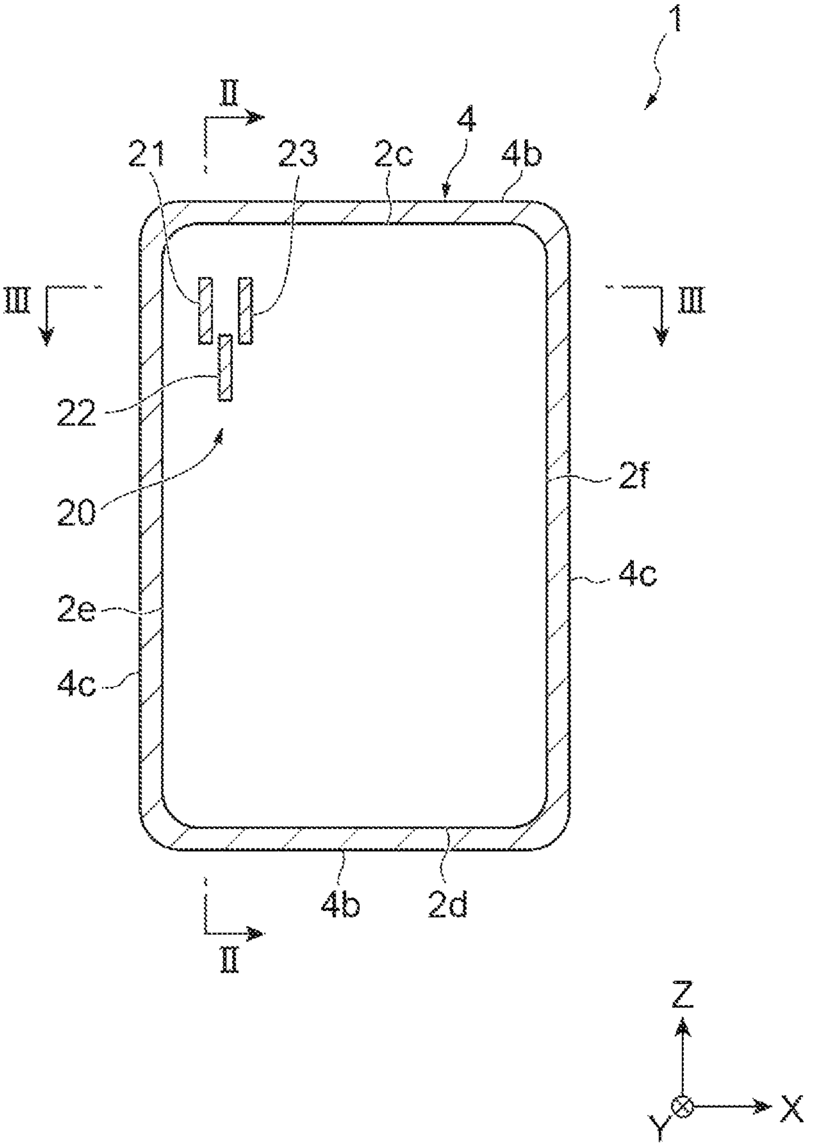
FIG. 4 is a cross-sectional view of the multilayer coil component taken along line IV-IV.
Figure 5:
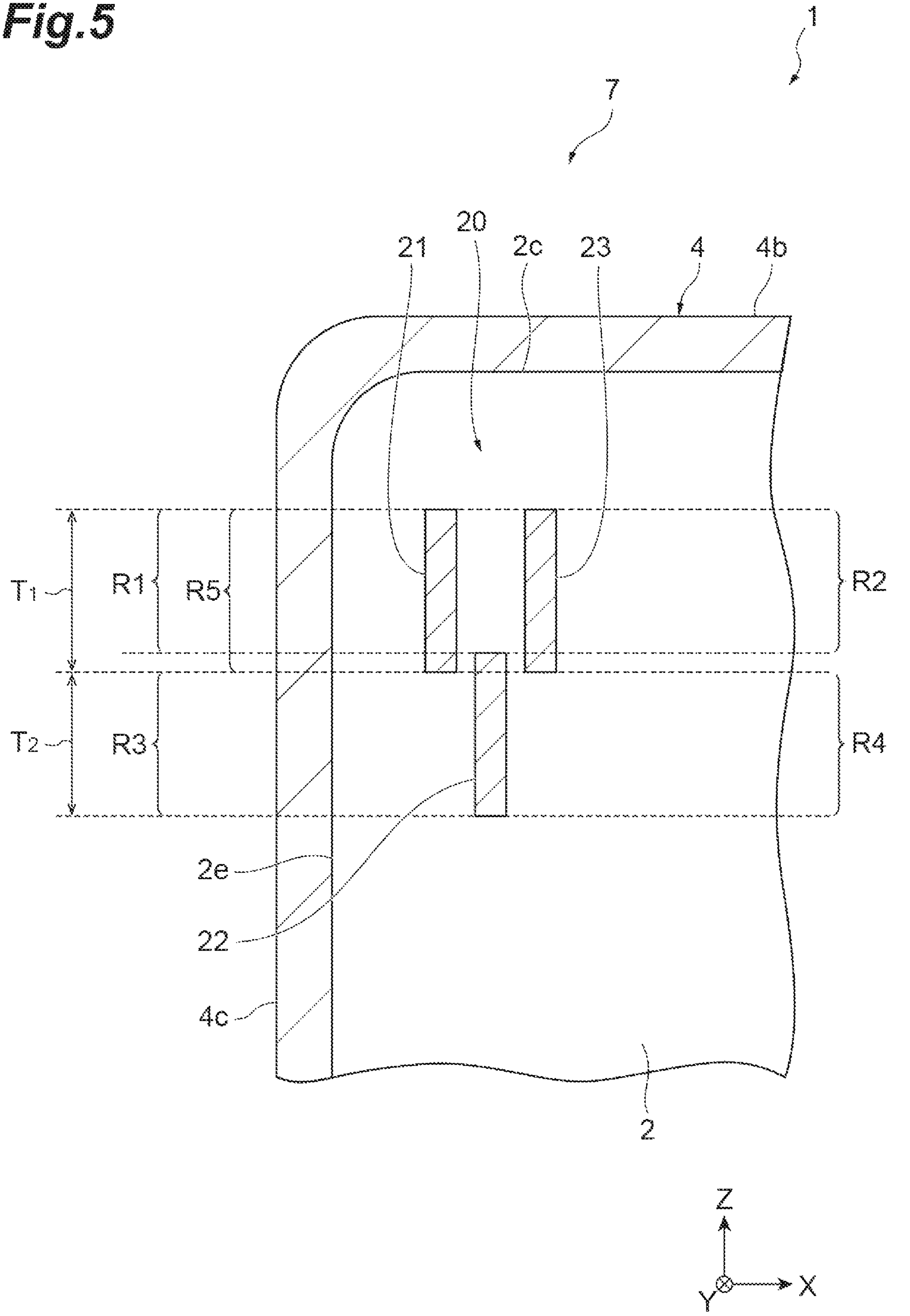
FIG. 5 is a partially enlarged view of a cross section of the multilayer coil component taken along line IV-IV.

First, a schematic configuration of a multilayer coil component 1 in the present embodiment will be described with reference to FIGS. 1 to 5. FIG. 1 is a perspective view of the multilayer coil component 1 in the present embodiment. FIGS. 2 to 4 are cross-sectional views of the multilayer coil component 1 in the present embodiment. FIG. 2 is a cross-sectional view of the multilayer coil component taken along line II-II. FIG. 3 is a cross-sectional view of the multilayer coil component taken along line III-III. FIG. 4 is a cross-sectional view of the multilayer coil component taken along line IV-IV. FIG. 5 is a partially enlarged view of the cross section illustrated in FIG. 4. The X-axis direction, the Y-axis direction, and the Z-axis direction are mutually intersecting directions. In the present embodiment, the X-axis direction, the Y-axis direction, and the Z-axis direction are mutually orthogonal. The X-axis direction corresponds to a first direction, the Z-axis direction corresponds to a second direction, and the Y-axis direction corresponds to a third direction.

As illustrated in FIG. 1, the multilayer coil component 1 includes an element body 2 and a pair of external electrodes 4 and 5. The external electrode 5 corresponds to a second external electrode in a case where, for example, the external electrode 4 is a first external electrode. The multilayer coil component 1 is solder-mounted on, for example, an electronic device. The electronic device includes, for example, a circuit board or an electronic component. In the present embodiment, the element body 2 is formed by a plurality of layers stacked in the Z-axis direction. The plurality of layers are, for example, ceramic sheets. The element body 2 is formed by, for example, heat treatment after the plurality of layers are stacked. The heat treatment temperature is, for example, approximately 850 to 900° C.

The element body 2 has, for example, an insulating property. The element body 2 is configured by, for example, a magnetic material. The magnetic material includes, for example, at least one selected from a Ni—Cu—Zn-based ferrite material, a Ni—Cu—Zn—Mg-based ferrite material, and a Ni—Cu-based ferrite material. The magnetic material configuring the element body 2 may include a Fe alloy or the like. The element body 2 may be configured by a non-magnetic material. The non-magnetic material includes, for example, at least one selected from a glass ceramic material and a dielectric material.

The element body 2 has, for example, a rectangular parallelepiped shape. The rectangular parallelepiped shape includes the shape of a rectangular parallelepiped with chamfered corner and ridge portions and the shape of a rectangular parallelepiped with rounded corner and ridge portions. The shape of the element body 2 is not limited to the rectangular parallelepiped shape. For example, the element body 2 may have a cylindrical shape. The element body 2 has a pair of end surfaces 2*a* and 2*b*, a pair of side surfaces 2*c* and 2*d*, and a pair of main surfaces 2*e* and 2*f* as the outer surface thereof. The area of each of the main surfaces 2*e* and 2*f* is larger than the area of any of the end surface 2*a*, the end surface 2*b*, the side surface 2*c*, and the side surface 2*d*. Each of the main surfaces 2*e* and 2*f* is also a side surface of the element body 2 having a rectangular parallelepiped shape. In the multilayer coil component 1, the one side surface 2*d* is a mounting surface mounted on an electronic device. In the multilayer coil component 1, the one side surface 2*d* faces the electronic device. The end surface 2*b* corresponds to a second surface in a case where the end surface 2*a* corresponds to a first surface.

The pair of end surfaces 2*a* and 2*b* face each other in the Y-axis direction. The pair of side surfaces 2*c* and 2*d* face each other in the Z-axis direction. The pair of main surfaces 2*e* and 2*f* face each other in the X-axis direction. The Z-axis-direction length of the element body 2 is, for example, smaller than the Y-axis-direction length of the element body 2. The X-axis-direction length of the element body 2 is, for example, smaller than the Y-axis-direction and Z-axis-direction lengths of the element body 2. The length ratio of the element body 2 in the X-axis direction, the Y-axis direction, and the Z-axis direction is not limited thereto. The Y-axis direction is, for example, a longitudinal direction. The X-axis direction is, for example, a width direction. The Z-axis direction is, for example, a height direction.

The pair of external electrodes 4 and 5 are separated from each other and disposed on the outer surface of the element body 2. The pair of external electrodes 4 and 5 face each other in the Y-axis direction. The pair of external electrodes 4 and 5 are separated from each other in the Y-axis direction.

The pair of external electrodes 4 and 5 are formed by a known method. The pair of external electrodes 4 and 5 are configured from, for example, a metal material. The metal material is, for example, copper, silver, gold, nickel, or chromium. The pair of external electrodes 4 and 5 are formed by, for example, plating an electrode layer. The electrode layer is made of, for example, a conductive paste. The conductive paste is applied by, for example, a dip method, a printing method, or a transfer method. The plating treatment is, for example, electrolytic plating or electroless plating. By this plating treatment, a plating layer is formed on the outer surface of the conductive paste.

The external electrode 4 includes, for example, parts 4*a*, 4*b*, and 4*c*. The part 4*a* of the external electrode 4 is provided on the end surface 2*a*. The part 4*b* of the external electrode 4 is provided on the pair of side surfaces 2*c* and 2*d*. The part 4*c* of the external electrode 4 is provided on the pair of main surfaces 2*e* and 2*f*. The part 4*a* of the external electrode 4 covers, for example, the entire surface of the end surface 2*a*. The parts 4*b* and 4*c* of the external electrode 4 cover, for example, a part of the pair of side surfaces 2*c* and 2*d* and the pair of main surfaces 2*e* and 2*f*. The part 4*a* of the external electrode 4 is connected to the parts 4*b* and 4*c* of the external electrode 4.

On each of the side surfaces 2*c* and 2*d*, the region covered with the part 4*b* of the external electrode 4 has, for example, a rectangular shape. On each of the main surfaces 2*e* and 2*f*, the region covered with the part 4*c* of the external electrode 4 has, for example, a rectangular shape. In this specification, "connection" means connection in a direct contact state. "Direct contact" means interconnection without the intervention of another member illustrated in this specification. "Direct contact" does not exclude connection via a member not specified in this specification.

The external electrode 5 includes, for example, parts 5*a*, 5*b*, and 5*c*. The part 5*a* of the external electrode 5 is provided on the end surface 2*a*. The part 5*b* of the external electrode 5 is provided on the pair of side surfaces 2*c* and 2*d*. The part 5*c* of the external electrode 5 is provided on the pair of main surfaces 2*e* and 2*f*. The part 5*a* of the external electrode 5 covers, for example, the entire surface of the end surface 2*a*. The parts 5*b* and 5*c* of the external electrode 5 cover, for example, a part of the pair of side surfaces 2*c* and 2*d* and the pair of main surfaces 2*e* and 2*f*. The part 5*a* of the external electrode 5 is connected to the parts 5*b* and 5*c* of the external electrode 5. On each of the side surfaces 2*c* and 2*d*, the region covered with the part 5*b* of the external electrode 5 has, for example, a rectangular shape. On each of the main surfaces 2*e* and 2*f*, the region covered with the part 5*c* of the external electrode 5 has, for example, a rectangular shape.

The multilayer coil component 1 further includes a coil 10 disposed in the element body 2 as illustrated in FIGS. 2 and 3. The coil 10 includes a plurality of coil conductors 7 and a plurality of vias 8. The plurality of coil conductors 7 are stacked in the X-axis direction. Each of the coil conductors 7 corresponds to an internal conductor layer. Each of the vias 8 corresponds to a connecting conductor. Each of the vias 8 penetrates the element body 2 positioned between a pair of the coil conductors 7 and connects the pair of coil conductors 7. The plurality of coil conductors 7 are electrically interconnected via the plurality of vias 8. The plurality of coil conductors 7 and the plurality of vias 8 are configured by a conductive material. The conductive material includes, for example, at least one selected from Ag and Pd.

The coil 10 is formed by the plurality of coil conductors 7 and the plurality of vias 8. The coil 10 electrically connects the external electrode 4 and the external electrode 5. In other words, the pair of external electrodes 4 and 5 are electrically interconnected via the plurality of coil conductors 7. The coil 10 is configured by, for example, triple winding and single winding. The coil 10 has a coil axis AX extending parallel to the X-axis direction. The plurality of vias 8 overlap when viewed from the X-axis direction. In the multilayer coil component 1, the coil 10 has a spiral structure traveling counterclockwise along the X-axis direction.

The plurality of coil conductors 7 include a first conductor group 7*a* and a second conductor group 7P as illustrated in FIGS. 2 and 3. In the multilayer coil component 1, each of the first conductor group 7*a* and the second conductor group 7P includes the plurality of coil conductors 7. The plurality of coil conductors 7 include a first coil conductor 11, a second coil conductor 12, and a third coil conductor 13. In the present embodiment, each of the first conductor group 7*a* and the second conductor group 7P includes the first coil conductor 11, the second coil conductor 12, and the third coil conductor 13.

The coil 10 includes an annular portion 15 formed in an annular shape when viewed from the extension direction of the coil axis AX. The coil axis AX is positioned at the geometric center of the annular portion 15 when viewed from the X-axis direction. Further, the coil 10 includes an extending portion 16 connecting the annular portion 15 and the external electrode 4 and an extending portion 17 connecting the annular portion 15 and the external electrode 5. The annular portion 15 and the extending portions 16 and 17 are formed by the first conductor group 7*a* and the second conductor group 7P. The extending portion 16 is included in the first conductor group 7*a*. The extending portion 17 is included in the second conductor group 7P.

The extending portion 16 of the first conductor group 7*a* includes a plurality of end portions 20. The end portion 20 corresponds to the tip of the coil 10. The plurality of end portions 20 are exposed from the element body 2 on the end surface 2*a* and connected to the part 4*a* of the external electrode 4. The extending portion 17 of the second conductor group 7P includes at least one end portion 30. The end portion 30 corresponds to the tip of the coil 10. The at least one end portion 30 is exposed from the element body 2 on the end surface 2*b* and connected to the part 5*a* of the external electrode 5. In the multilayer coil component 1, the second conductor group 7P includes a plurality of the end portions 30.

In the first conductor group 7*a* and the second conductor group 7P of the present embodiment, each of the plurality of end portions 20 and the plurality of end portions 30 include a first end portion 21, a second end portion 22, and a third end portion 23. The first end portion 21 is included in the first coil conductor 11. The second end portion 22 is included in the second coil conductor 12. The third end portion 23 is included in the third coil conductor 13. The first end portion 21, the second end portion 22, and the third end portion 23 are exposed from the element body 2 on the end surface 2*a* and connected to the part 4*a* of the external electrode 4.

As a modification example of the present embodiment, the second conductor group 7P may not include the second coil conductor 12. In this case, for example, the Z-axis-direction distance between the first coil conductor 11 and the third coil conductor 13 in the second conductor group 7P is larger than the Z-axis-direction distance between the first coil conductor 11 and the second coil conductor 12 in the first conductor group 7*a*. The Z-axis-direction distance between the first coil conductor 11 and the third coil conductor 13 in the second conductor group 7P is larger than the Z-axis-direction distance between the third coil conductor 13 and the second coil conductor 12 in the first conductor group 7*a*. For example, the number of the end portions 30 included in the second conductor group 7P may be smaller than the number of the end portions 20 included in the first conductor group 7*a*. As a further modification example of the present embodiment, the second conductor group 7*p* may include only one coil conductor 7.

As illustrated in FIGS. 3 to 5, the first end portion 21, the second end portion 22, and the third end portion 23 are arranged in order in the X-axis direction when viewed from the Z-axis direction. In other words, the plurality of end portions 20 are arranged in the order of the first end portion 21, the second end portion 22, and the third end portion 23 in the X-axis direction. The X-axis direction and the Z-axis direction are along the end surface 2*a*. In the plurality of end portions 20, the first end portion 21 and the second end portion 22 are adjacent to each other when viewed from the Z-axis direction. In the plurality of end portions 20, the second end portion 22 and the third end portion 23 are adjacent to each other when viewed from the Z-axis direction. The second end portion 22 is disposed between the first end portion 21 and the third end portion 23 when viewed from the Z-axis direction.

As illustrated in FIG. 5, the first end portion 21 has a region R1 not overlapping the second end portion 22 when viewed from the X-axis direction. The third end portion 23 has a region R2 not overlapping the second end portion 22 when viewed from the X-axis direction. In the multilayer coil component 1, the region R1 and the region R2 are the same. The second end portion 22 includes a region R3 not overlapping the first end portion 21 and a region R4 not overlapping the third end portion 23 when viewed from the X-axis direction. In the multilayer coil component 1, the region R3 and the region R4 are the same. In the multilayer coil component 1, the regions R3 and R4 of the second end portion 22 do not overlap both the first end portion 21 and the third end portion 23 when viewed from the X-axis direction.

The first end portion 21 and the third end portion 23 face each other in the X-axis direction at least in part. The first end portion 21 and the third end portion 23 overlap each other when viewed from the X-axis direction at least in part. The first end portion 21 and the third end portion 23 overlap each other when viewed from the X-axis direction in a region R5.

The first end portion 21, the second end portion 22, and the third end portion 23 have, for example, the same width T1 in the Z-axis direction. The second end portion 22 is displaced by a deviation width T2 in the Z-axis direction from the first end portion 21 and the third end portion 23. The second end portion 22 is more separated in the Z-axis direction from the side surface 2*c* than the first end portion 21 and the third end portion 23. In the multilayer coil component 1, the deviation width T2 is smaller than the width T1. Accordingly, when viewed from the X-axis direction, the second end portion 22 overlaps the first end portion 21 and the third end portion 23. As a result of the above configuration, the first end portion 21, the second end portion 22, and the third end portion 23 are arranged in a V shape when viewed from the Y-axis direction.

In the multilayer coil component 1, the length of the current path of the first coil conductor 11 including the first end portion 21 is shorter than the length of the current path of the second coil conductor 12 including the second end portion 22. The length of the current path of the third coil conductor 13 including the third end portion 23 is shorter than the length of the current path of the second coil conductor 12 including the second end portion 22. The length of the current path of the first coil conductor 11 including the first end portion 21 is equivalent to the length of the current path of the third coil conductor 13 including the third end portion 23.

In the first conductor group 7*a*, "length of the current path of each coil conductor 7" is the length of the current path from a connecting part 20*a* connecting the external electrode 4 and the coil conductor 7 to a connecting part 8*a* between the coil conductor 7 and the via 8. In the second conductor group 7P, "length of the current path of each coil conductor 7" is the length of the current path from a connecting part 30*a* connecting the external electrode 5 and the coil conductor 7 to the connecting part 8*a* between the coil conductor 7 and the via 8. "Current path of the coil conductor 7" is the path through which a current flows in the coil conductor 7 in a case where a current is passed between the external electrode 4 and the external electrode 5 of the multilayer coil component 1. For example, the current path of the coil conductor 7 is the shortest path on the coil conductor 7 from one end of the coil conductor 7 to the other end of the coil conductor.

In the extending portions 16 and 17 of the present embodiment, the first coil conductor 11 linearly extends in the Y-axis direction from the connecting parts 20*a* and 30*a* between the first coil conductor 11 and the external electrodes 4 and 5. In the extending portions 16 and 17, the third coil conductor 13 linearly extends in the Y-axis direction from the connecting parts 20*a* and 30*a* between the third coil conductor 13 and the external electrodes 4 and 5. In the extending portions 16 and 17, the second coil conductor 12 is curved and extends in the Y-axis direction from the connecting parts 20*a* and 30*a* between the second coil conductor 12 and the external electrodes 4 and 5. When viewed from the Y-axis direction, the shortest distance between the second end portion 22 and the coil axis AX in the X-axis direction is smaller than the shortest distance between the first end portion 21 and the coil axis AX in the X-axis direction. When viewed from the Y-axis direction, the shortest distance between the second end portion 22 and the coil axis AX in the X-axis direction is smaller than the shortest distance between the third end portion 23 and the coil axis AX in the X-axis direction.

Figure 6:
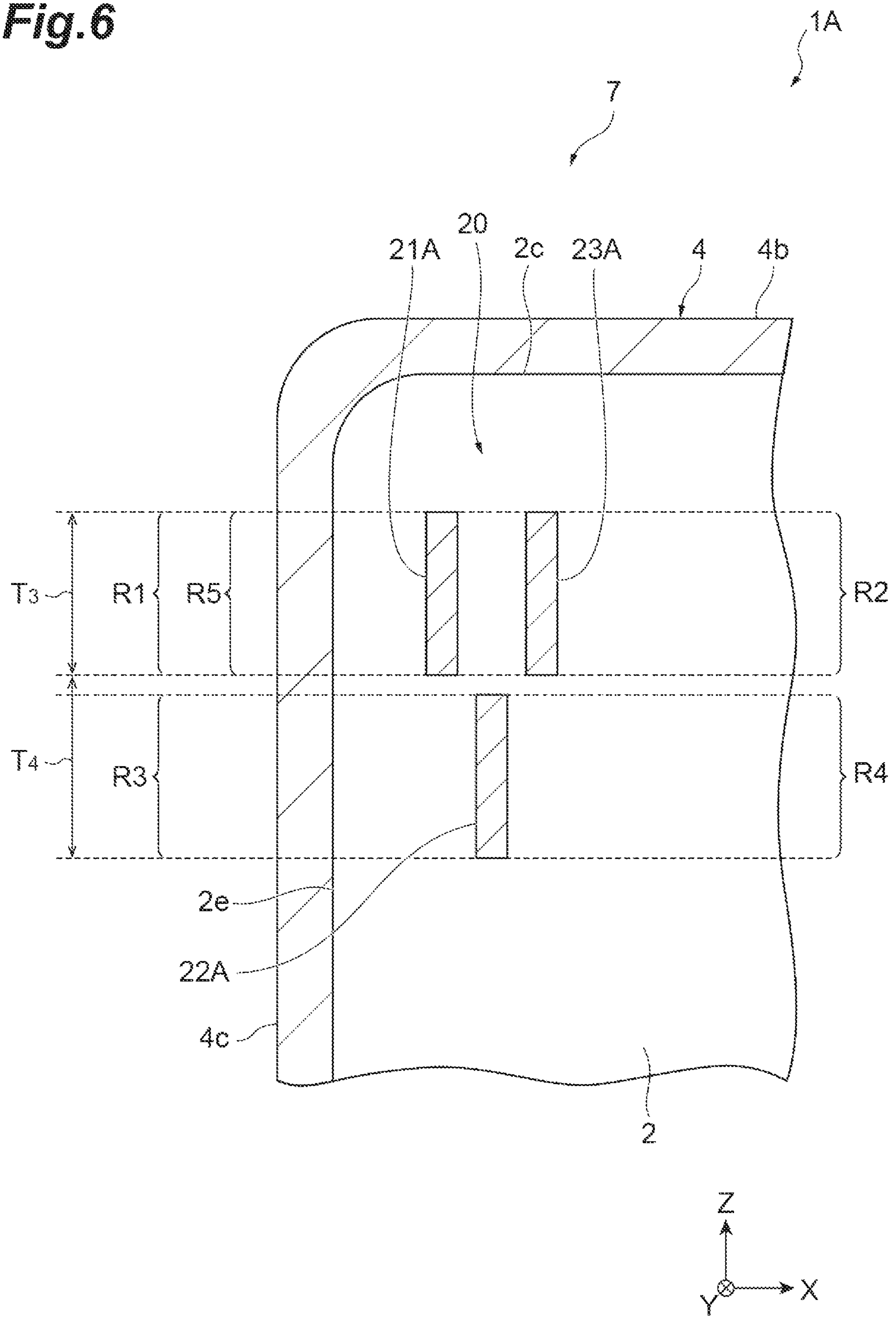
FIG. 6 is a partially enlarged view of a cross section of a multilayer coil component in a modification example of the present embodiment.
Figure 7:
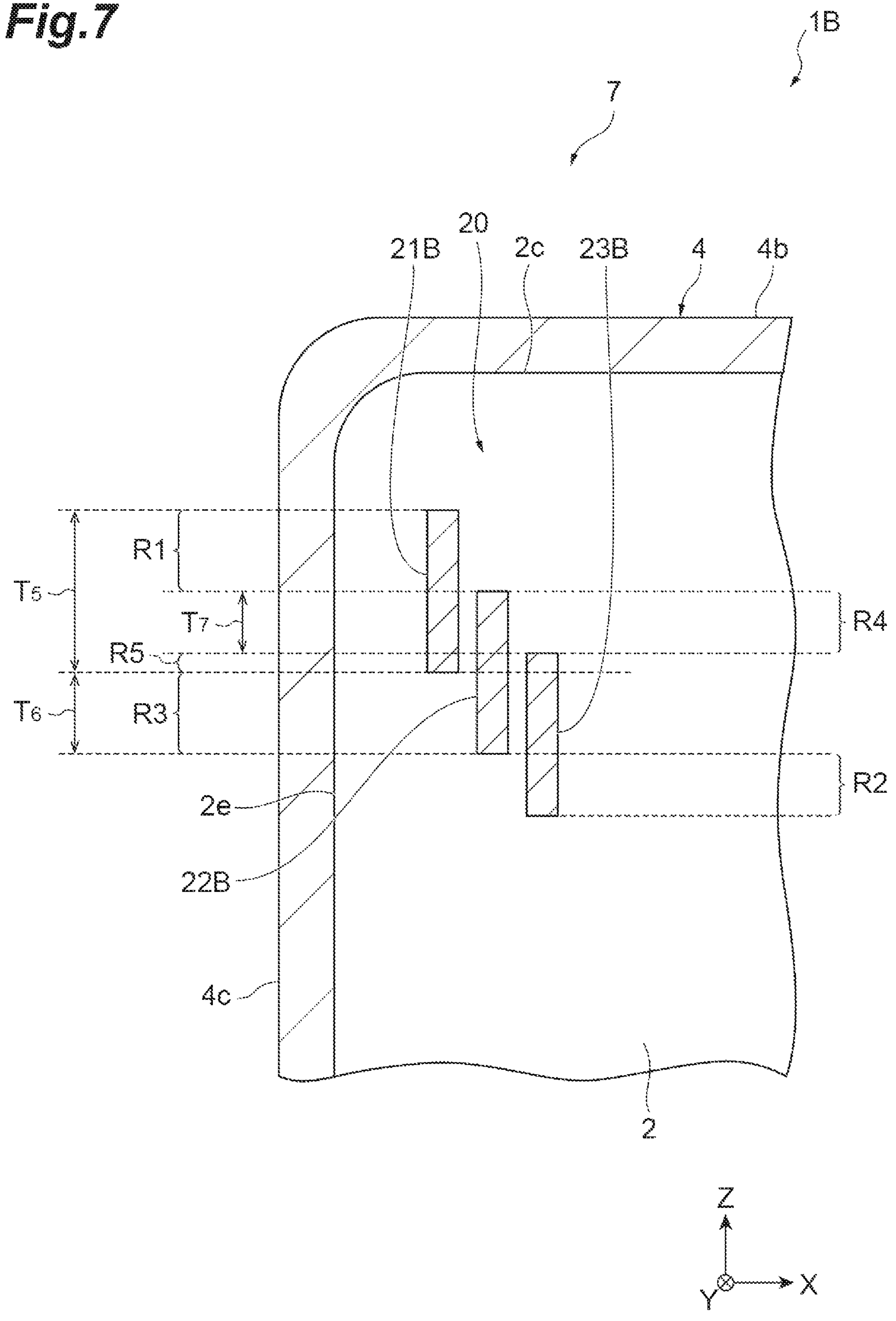
FIG. 7 is a partially enlarged view of a cross section of a multilayer coil component in a modification example of the present embodiment.
Figure 8:
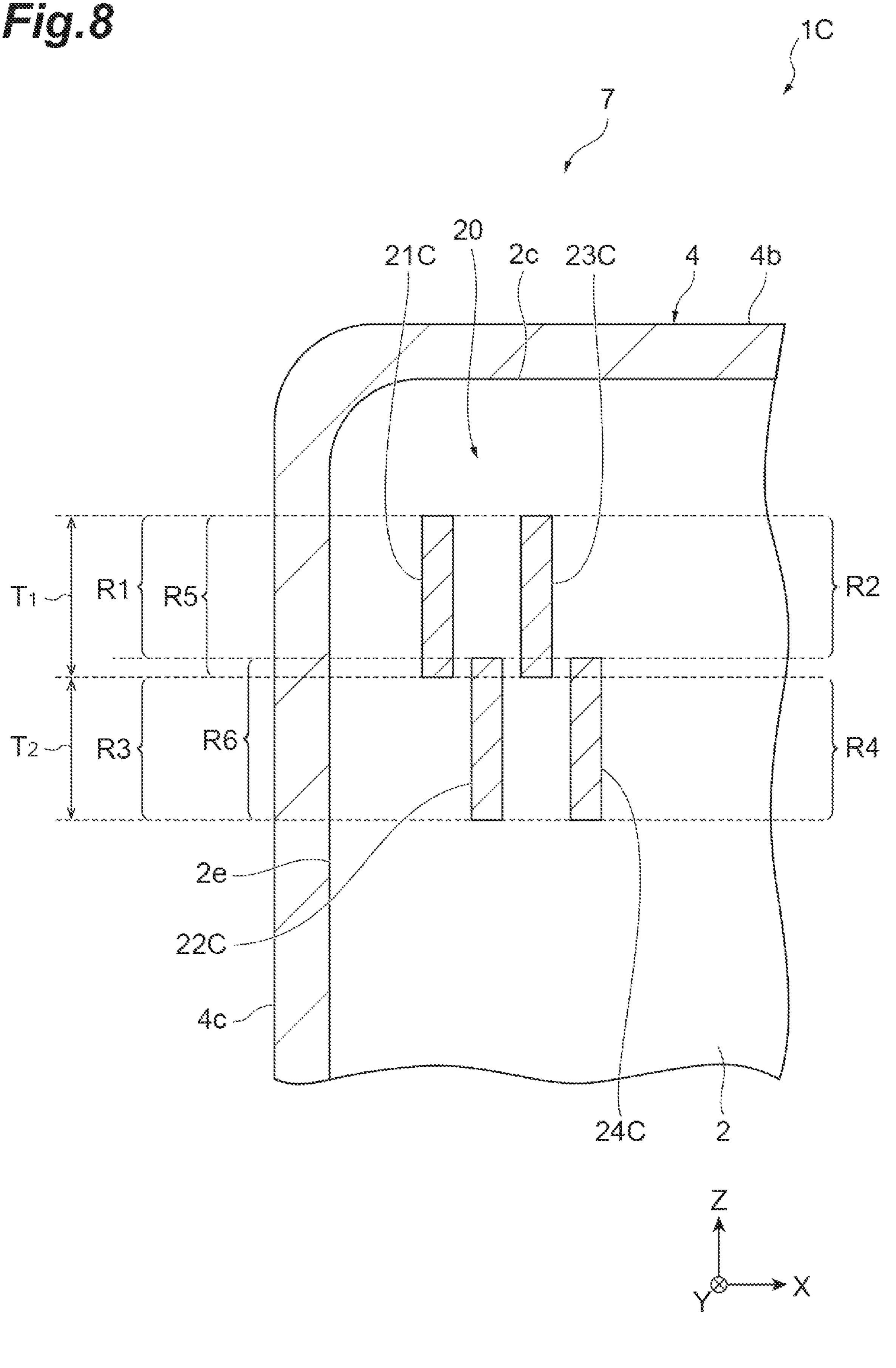
FIG. 8 is a partially enlarged view of a cross section of a multilayer coil component in a modification example of the present embodiment.

Next, multilayer coil components 1A, 1B, and 1C in modification examples of the present embodiment will be described with reference to FIGS. 6 to 8. FIG. 6 is a partially enlarged view of a cross section of the multilayer coil component 1A. FIG. 7 is a partially enlarged view of a cross section of the multilayer coil component 1B. FIG. 8 is a partially enlarged view of a cross section of the multilayer coil component 1C. The positions of the cross sections illustrated in FIGS. 6 to 8 correspond to the position of the cross section of the multilayer coil component 1 taken along line IV-IV. These modification examples are generally similar or identical to the multilayer coil component 1 described above. Hereinafter, differences from the multilayer coil component 1 described above will be mainly described.

First, the multilayer coil component 1A will be described. The multilayer coil component 1A illustrated in FIG. 6 differs from the above embodiment in terms of the disposition of the plurality of end portions 20. In the multilayer coil component 1A, the plurality of end portions 20 include a first end portion 21A, a second end portion 22A, and a third end portion 23A. The first end portion 21A corresponds to the first end portion 21. The second end portion 22A corresponds to the second end portion 22. The third end portion 23A corresponds to the third end portion 23.

The first end portion 21A has the region R1 not overlapping the second end portion 22A when viewed from the X-axis direction. The third end portion 23A has the region R2 not overlapping the second end portion 22A when viewed from the X-axis direction. In the multilayer coil component 1A, the region R1 and the region R2 are the same. The second end portion 22A includes the region R3 not overlapping the first end portion 21A and the region R4 not overlapping the third end portion 23A when viewed from the X-axis direction. In the multilayer coil component 1A, the region R3 and the region R4 are the same. The first end portion 21A and the third end portion 23A overlap each other when viewed from the X-axis direction in the region R5.

The first end portion 21A, the second end portion 22A, and the third end portion 23A have, for example, the same width T3 in the Z-axis direction. The second end portion 22A is displaced by a deviation width T4 in the Z-axis direction from the first end portion 21A and the third end portion 23A. The second end portion 22A is more separated in the Z-axis direction from the side surface 2*c* than the first end portion 21A and the third end portion 23A. In the multilayer coil component 1A, the deviation width T4 is larger than the width T3. Accordingly, when viewed from the X-axis direction, each of the first end portion 21A and the third end portion 23A does not overlap the second end portion 22A.

Next, the multilayer coil component 1B will be described. The multilayer coil component 1B illustrated in FIG. 7 differs from the above embodiment in terms of the disposition of the plurality of end portions 20. In the multilayer coil component 1B, the plurality of end portions 20 include a first end portion 21B, a second end portion 22B, and a third end portion 23B. The first end portion 21B corresponds to the first end portion 21. The second end portion 22B corresponds to the second end portion 22. The third end portion 23B corresponds to the third end portion 23. In the multilayer coil component 1B, the first end portion 21B and the third end portion 23B are displaced in the Z-axis direction.

The first end portion 21B has the region R1 not overlapping the second end portion 22B when viewed from the X-axis direction. The third end portion 23B has the region R2 not overlapping the second end portion 22B when viewed from the X-axis direction. In the multilayer coil component 1B, the region R1 and the region R2 are displaced in the Z-axis direction. The second end portion 22B includes the region R3 not overlapping the first end portion 21B and the region R4 not overlapping the third end portion 23B when viewed from the X-axis direction. In the multilayer coil component 1B, the region R3 and the region R4 are displaced in the Z-axis direction. The first end portion 21B and the third end portion 23B overlap each other when viewed from the X-axis direction in the region R5.

The first end portion 21B, the second end portion 22B, and the third end portion 23B have, for example, the same width T5 in the Z-axis direction. The second end portion 22B is displaced by a deviation width T6 in the Z-axis direction from the first end portion 21B. The second end portion 22B is more separated in the Z-axis direction from the side surface 2*c* than the first end portion 21B. In the multilayer coil component 1B, the deviation width T6 is smaller than the width T5. Accordingly, when viewed from the X-axis direction, the second end portion 22B overlaps the first end portion 21B.

The second end portion 22B is displaced by a deviation width T7 in the Z-axis direction from the third end portion 23B. The third end portion 23B is more separated in the Z-axis direction from the side surface 2*c* than the second end portion 22B. In the multilayer coil component 1B, the deviation width T7 is smaller than the width T5. Accordingly, when viewed from the X-axis direction, the second end portion 22B overlaps the third end portion 23B. As a result of the above configuration, the first end portion 21B, the second end portion 22B, and the third end portion 23B are arranged in tiers so as to be separated in order from the side surface 2*c* in the Y-axis direction.

In the multilayer coil component 1B, the length of the current path of the first coil conductor 11 including the first end portion 21B is shorter than the length of the current path of the second coil conductor 12 including the second end portion 22B. The length of the current path of the third coil conductor 13 including the third end portion 23B is longer than the length of the current path of the second coil conductor 12 including the second end portion 22B. The length of the current path of the first coil conductor 11 including the first end portion 21B is shorter than the length of the current path of the third coil conductor 13 including the third end portion 23B.

In the extending portions 16 and 17 of the multilayer coil component 1B, the first coil conductor 11 linearly extends in the Y-axis direction from the connecting parts 20*a* and 30*a* connecting the first coil conductor 11 and the external electrodes 4 and 5. In the extending portions 16 and 17, the third coil conductor 13 of the multilayer coil component 1B is curved and extends in the Y-axis direction from the connecting parts 20*a* and 30*a* between the third coil conductor 13 and the external electrodes 4 and 5. In the extending portions 16 and 17, the second coil conductor 12 is curved and extends in the Y-axis direction from the connecting parts 20*a* and 30*a* between the second coil conductor 12 and the external electrodes 4 and 5. When viewed from the Y-axis direction, the shortest distance between the second end portion 22B and the coil axis AX in the X-axis direction is smaller than the shortest distance between the first end portion 21B and the coil axis AX in the X-axis direction. When viewed from the Y-axis direction, the shortest distance between the second end portion 22B and the coil axis AX in the X-axis direction is larger than the shortest distance between the third end portion 23B and the coil axis AX in the X-axis direction.

Next, the multilayer coil component 1C will be described. The multilayer coil component 1C illustrated in FIG. 8 differs from the above embodiment in terms of the number of the plurality of end portions 20. In the multilayer coil component 1C, the plurality of end portions 20 include a first end portion 21C, a second end portion 22C, and a third end portion 23C. The first end portion 21C corresponds to the first end portion 21. The second end portion 22C corresponds to the second end portion 22. The third end portion 23C corresponds to the third end portion 23. In the multilayer coil component 1C, the plurality of coil conductors 7 further include a fourth end portion 24C exposed from the element body 2 on the end surface 2*a* and connected to the external electrode 4.

The first end portion 21C, the second end portion 22C, the third end portion 23C, and the fourth end portion 24C are arranged in order in the X-axis direction when viewed from the Z-axis direction. As illustrated in FIG. 8, the plurality of end portions 20 are arranged in the order of the first end portion 21C, the second end portion 22C, the third end portion 23C, and the fourth end portion 24C in the X-axis direction. In the plurality of end portions 20, the third end portion 23C and the fourth end portion 24C are adjacent to each other when viewed from the Z-axis direction. The third end portion 23C is disposed between the second end portion 22C and the fourth end portion 24C when viewed from the Z-axis direction.

The first end portion 21C has the region R1 not overlapping the second end portion 22C when viewed from the X-axis direction. The third end portion 23C has the region R2 not overlapping the second end portion 22C when viewed from the X-axis direction. In the multilayer coil component 1C, the region R1 and the region R2 are the same. The second end portion 22C includes the region R3 not overlapping the first end portion 21C and the region R4 not overlapping the third end portion 23C when viewed from the X-axis direction. In the multilayer coil component 1C, the region R3 and the region R4 are the same. The first end portion 21C and the third end portion 23C overlap each other when viewed from the X-axis direction in the region R5.

In this modification example, the second end portion 22C and the fourth end portion 24C face each other in the X-axis direction at least in part. The second end portion 22C and the fourth end portion 24C overlap each other when viewed from the X-axis direction at least in part. The second end portion 22C and the fourth end portion 24C overlap each other when viewed from the X-axis direction in a region R6. Similarly to the second end portion 22C, the fourth end portion 24C includes the region R3 not overlapping the first end portion 21C and the region R4 not overlapping the third end portion 23C when viewed from the X-axis direction.

The first end portion 21C, the second end portion 22C, the third end portion 23C, and the fourth end portion 24C have, for example, the same width T1 in the Z-axis direction. The second end portion 22C and the fourth end portion 24C are displaced by the deviation width T2 in the Z-axis direction from the first end portion 21C. The second end portion 22C and the fourth end portion 24C are more separated in the Z-axis direction from the side surface 2*c* than the first end portion 21C. In the multilayer coil component 1C, the deviation width T2 is smaller than the width T1. Accordingly, when viewed from the X-axis direction, the second end portion 22C and the fourth end portion 24C overlap the first end portion 21C.

Next, the action and effect of the multilayer coil components 1, 1A, 1B, and 1C in the present embodiment and the modification examples will be described.

In the multilayer coil component 1, the first end portion 21 and the third end portion 23 overlap each other when viewed from the X-axis direction at least in part. Accordingly, the multilayer coil component 1 can be made compact and the current path difference between the coil conductors 7 can also be reduced. Desired characteristics can be easily ensured on condition that the current path difference between the coil conductors 7 is reduced. Since the first end portion 21 and the third end portion 23 respectively have the regions R1 and R2 not overlapping the second end portion 22 when viewed from the X-axis direction, the proximity effect attributable to a current passing through the end portions 20 and 30 and the generation of stray capacitance in the end portions can be suppressed. Accordingly, desired characteristics can be easily realized in a compact configuration. The multilayer coil components 1A, 1B, and 1C also have similar configurations.

In the multilayer coil component 1, the second end portion 22 includes the region R3 not overlapping the first end portion 21 and the region R4 not overlapping the third end portion 23 when viewed from the X-axis direction. In this case, the proximity effect between the first and third end portions 21 and 23 and the second end portion 22 and the stray capacitance in the second end portion can be further reduced. The multilayer coil components 1A, 1B, and 1C also have similar configurations.

Figure 9A:
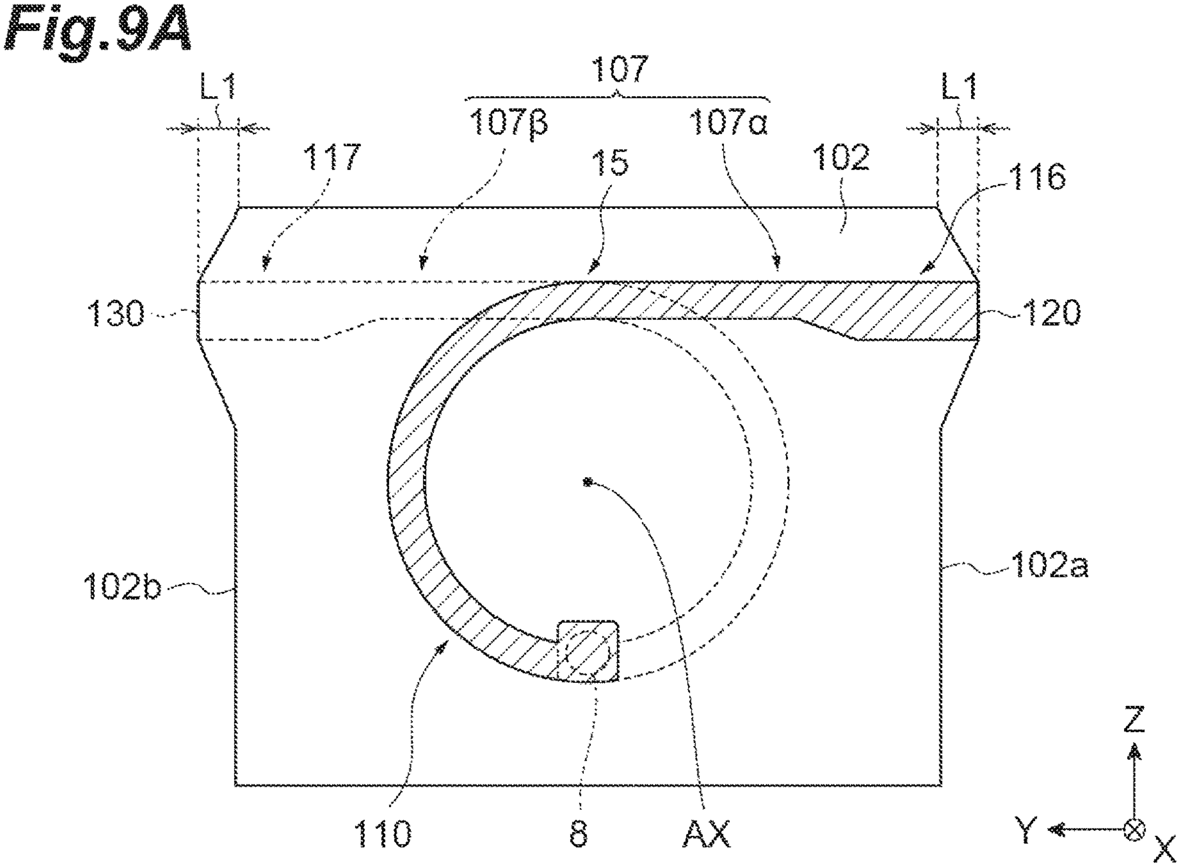
FIG. 9A is a cross-sectional view illustrating a part of a multilayer coil component in a comparative example.
Figure 9B:
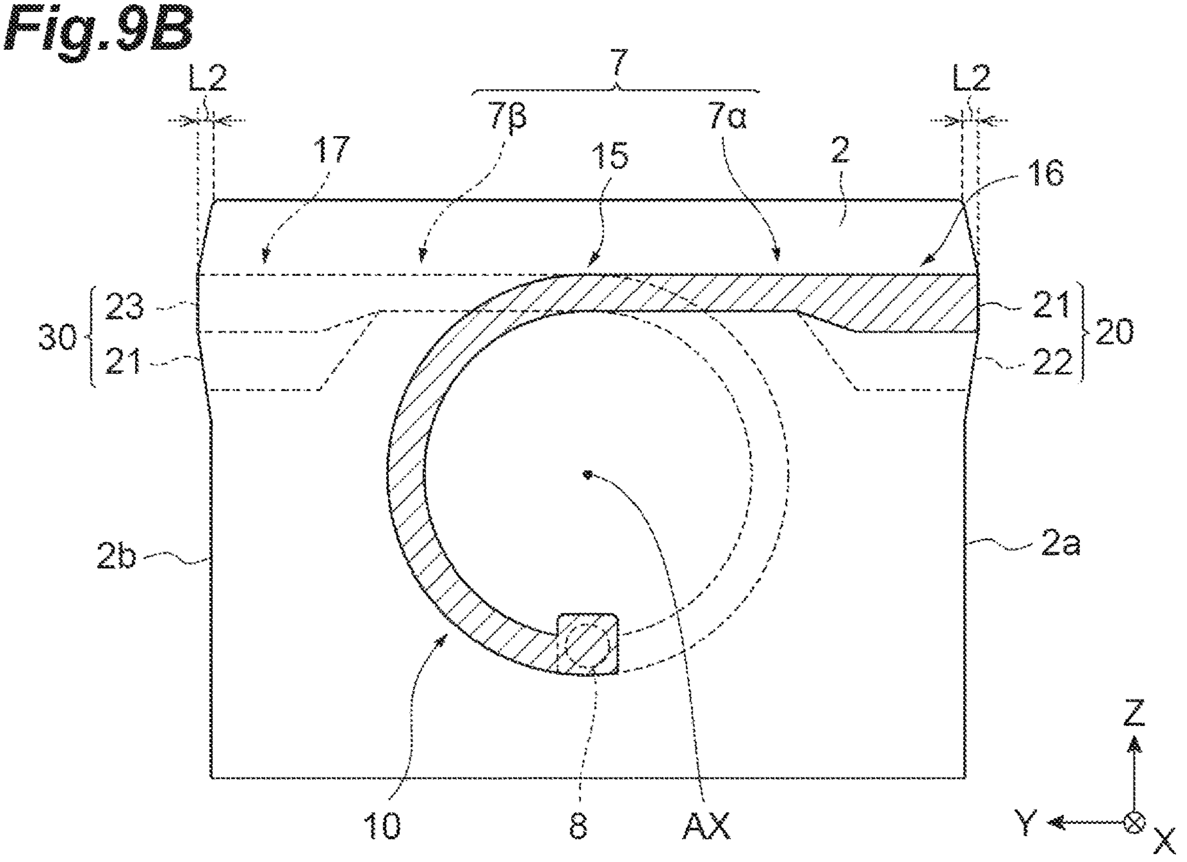
FIG. 9B is a cross-sectional view illustrating a part of an example of the multilayer coil component in the present embodiment.

FIG. 9A is a cross-sectional view illustrating a part of the multilayer structure of a multilayer coil component of a comparative example. FIG. 9B is a cross-sectional view illustrating a part of an example of the multilayer coil component in the present embodiment. FIGS. 9A and 9B illustrate a state where the pair of external electrodes 4 and 5 or a part corresponding thereto is removed from the multilayer coil component. In FIGS. 9A and 9B, a width L1 and a width L2, which will be described later, are drawn in a deformed manner.

The multilayer coil component of the comparative example illustrated in FIG. 9A includes an element body 102 corresponding to the element body 2, a plurality of coil conductors 107 corresponding to the plurality of coil conductors 7, and the plurality of vias 8. The element body 102 includes end surfaces 102*a* and 102*b* corresponding to the end surfaces 2*a* and 2*b*, respectively. The plurality of coil conductors 107 form a coil 110. The plurality of coil conductors 107 include a conductor group 107*a* corresponding to the first conductor group 7*a* and a conductor group 107P corresponding to the second conductor group 7P. The conductor group 107*a* includes an extending portion 116 corresponding to the extending portion 16. The conductor group 107P includes an extending portion 117 corresponding to the extending portion 17. The extending portion 116 includes a plurality of end portions 120 corresponding to the plurality of end portions 20. The extending portion 117 includes a plurality of end portions 130 corresponding to the plurality of end portions 30.

The plurality of end portions 120 completely overlap when viewed from the X-axis direction and do not have the regions R1, R2, R3, and R4. The edges of the plurality of end portions 120 coincide when viewed from the X-axis direction. The plurality of end portions 130 completely overlap when viewed from the X-axis direction and do not have the regions R1, R2, R3, and R4. The edges of the plurality of end portions 130 coincide when viewed from the X-axis direction. In such a structure, the end surfaces 102*a* and 102*b* of the element body 102 protrude by the width L1 in the Y-axis direction along the plurality of end portions 120 and the plurality of end portions 130. The protrusion of the end surfaces 102*a* and 102*b* in the Y-axis direction is caused by the shrinkage during the formation of the element body 102. In the shrinkage of the element body 102, the element body 102 is pulled to the surface of the plurality of coil conductors 107 and is deformed along the surface of the plurality of coil conductors 107. The shrinkage of the element body 102 occurs in, for example, the heat treatment during the formation of the element body 102.

In the multilayer coil components 1, 1A, 1B, and 1C, the protrusion of the end surfaces 2*a* and 2*b* of the element body 2 in the Y-axis direction is reduced. For example, the width L2 of the protrusion of the end surfaces 2*a* and 2*b* in the Y-axis direction is smaller than the width L1 of the protrusion of the end surfaces 102*a* and 102*b* in the Y-axis direction. Such a structure is because the plurality of end portions 20 and the plurality of end portions 30 do not completely overlap when viewed from the X-axis direction and one or more end portions 20 and 30 are displaced in the Z-axis direction. For example, in the multilayer coil component 1, the first end portion 21 and the third end portion 23 respectively have the regions R1 and R2 not overlapping the second end portion 22 when viewed from the X-axis direction and the second end portion 22 has the regions R3 and R4 not overlapping the first end portion 21 and the third end portion 23 when viewed from the X-axis direction. Accordingly, in the shrinkage of the element body 2, the force of the element body 2 being pulled to the surface of the plurality of coil conductors 7 is dispersed. As a result, it is conceivable that the protrusion of the end surfaces 2*a* and 2*b* of the element body 2 in the Y-axis direction is reduced.

In the multilayer coil component 1, the second end portion 22 has the regions R3 and R4 not overlapping both the first end portion 21 and the third end portion 23 when viewed from the X-axis direction. In this case, the multilayer coil component 1 can be configured such that the region R5 where the first end portion 21 and the third end portion 23 overlap when viewed from the X-axis direction is relatively large. Accordingly, the multilayer coil component 1 can be made compact and the variation in the current path of the coil conductor 7 can be reduced. Desired characteristics can be more easily ensured on condition that the variation in the current path of the coil conductor 7 is reduced. The multilayer coil components 1A and 1C also have similar configurations.

In the multilayer coil component 1, the plurality of coil conductors 7 include the first coil conductor 11, the second coil conductor 12, and the third coil conductor 13. The first coil conductor 11 includes the first end portion 21. The second coil conductor 12 includes the second end portion 22. The third coil conductor 13 includes the third end portion 23. The lengths of the current paths of the first and third coil conductors 11 and 13 are shorter than the length of the current path of the second coil conductor 12. In this case, of the first, second, and third end portions 21, 22, and 23, the current paths of the first and third end portions 21 and 23 are reduced as compared with the current path of the second end portion 22. Accordingly, the direct current resistance of the plurality of coil conductors 7 including the first, second, and third end portions 21, 22, and 23 can be further reduced. The multilayer coil components 1A and 1C also have similar configurations.

In the multilayer coil component 1, the first coil conductor 11 linearly extends in the Y-axis direction from the connecting part 20*a* where the first coil conductor 11 and the external electrode 4 are connected. In this case, the current path of the first end portion 21 can be configured to be shortest. The multilayer coil components 1A, 1B, and 1C also have similar configurations.

In the multilayer coil component 1, the plurality of coil conductors 7 form the coil 10 having the coil axis AX extending in the X-axis direction. In the Z-axis direction, the shortest distance between the second end portion 22 and the coil axis AX is smaller than the shortest distance between the first end portion 21 and the coil axis AX. In this case, the disposition space of the second end portion 22 can be ensured while the multilayer coil component 1 is made compact. The multilayer coil components 1A, 1B, and 1C also have similar configurations.

In the multilayer coil component 1A, each of the first end portion 21A and the third end portion 23A does not overlap the second end portion 22A when viewed from the X-axis direction. In this case, the proximity effect between the first and third end portions 21A and 23A and the second end portion 22A and the stray capacitance in the second end portion 22A can be further reduced.

The plurality of coil conductors 7 may include the first conductor group 7*a* and the second conductor group 7P. The first conductor group 7*a* may include the plurality of end portions 20 exposed from the element body 2 on the end surface 2*a* and connected to the external electrode 4. The second conductor group 7P may include at least one end portion 30 exposed from the element body 2 on the end surface 2*b* and connected to the external electrode 5. The first conductor group 7*a* may include the first end portion 21, the second end portion 22, and the third end portion 23. The number of the end portions 30 included in the second conductor group 7P may be smaller than the number of the end portions 20 included in the first conductor group 7*a*. In this case, a desired magnetic path length can be ensured by the configuration in which the number of the end portions 30 included in the second conductor group 7P is different from the number of the end portions 20 included in the first conductor group 7*a*. Since the number of the end portions 30 included in the second conductor group 7P is smaller than the number of the end portions 20 included in the first conductor group 7*a*, the proximity effect in the second conductor group 7P and the effect of stray capacitance can be easily reduced.

The end portion 30 in the second conductor group 7P may be one in number. In this case, since the end portion 30 included in the second conductor group 7P is one in number, no proximity effect occurs in the second conductor group 7P and the effect of stray capacitance in the end portion 30 can also be further reduced.

In the multilayer coil component 1C, the plurality of coil conductors 7 further include the fourth end portion 24C. The fourth end portion 24C is exposed from the element body 2 on the end surface 2*a* and connected to the external electrode 4. The first, second, third, and fourth end portions 21C, 22C, 23C, and 24C are arranged in order in the X-axis direction when viewed from the Z-axis direction. The second end portion 22C and the fourth end portion 24C overlap each other in the X-axis direction at least in part. Each of the second end portion 22C and the fourth end portion 24C has the region R4 not overlapping the third end portion 23C when viewed from the X-axis direction. In this case, compactness is achieved and desired characteristics can be easily realized even if four or more end portions 20 are exposed from the element body 2 on the end surface 2*a*.

Although the embodiment and modification examples of the present invention have been described above, the present invention is not necessarily limited to the embodiment and modification examples described above and various changes can be made without departing from the gist thereof.

For example, the multilayer coil components 1, 1A, 1B, and 1C are not limited to a configuration in which the coil axis AX of the coil 10 extends in the X-axis direction. The coil 10 may be configured to have the coil axis AX that extends in the Z-axis direction.

For example, the configuration of the multilayer coil component 1C may be combined with the configuration of the multilayer coil component 1A. For example, in the multilayer coil component 1C, similarly to the multilayer coil component 1A, the first end portion 21C and the third end portion 23C may not overlap the second end portion 22C and the fourth end portion 24C when viewed from the X-axis direction, respectively. In this case, the first end portion 21C, the second end portion 22C, the third end portion 23C, and the fourth end portion 24C are arranged in a zigzag shape when viewed from the Y-axis direction.

For example, the configuration of the multilayer coil component 1C may be combined with the configuration of the multilayer coil component 1B. For example, in the multilayer coil component 1C, similarly to the multilayer coil component 1B, the first end portion 21C, the second end portion 22C, the third end portion 23C, and the fourth end portion 24C may be arranged in tiers so as to be separated in order from the side surface 2*c* in the Y-axis direction.

REFERENCE SIGNS LIST

1, 1A, 1B, 1C: multilayer coil component, 2: element body, 4, 5: external electrode, 7: coil conductor, 7*a*: first conductor group, 7P: second conductor group, 10: coil, 11: first coil conductor, 12: second coil conductor, 13: third coil conductor, 20, 30: end portion, 21, 21A, 21B, 21C: first end portion, 22, 22A, 22B, 22C: second end portion, 23, 23A, 23B, 23C: third end portion, 24C: fourth end portion, AX: coil axis, R1, R2, R3, R4, R5, R6: region.

What is claimed is:

1. A multilayer coil component comprising:

an element body including first and second surfaces;

a coil disposed in the element body and including a plurality of coil conductors stacked in a first direction and electrically connected to each other; and a pair of external electrodes separated from each other, disposed on an outer surface of the element body, and electrically connected to each other via the plurality of coil conductors, wherein the pair of external electrodes include a first external electrode provided on the first surface and a second external electrode provided on the second surface, the plurality of coil conductors include first, second, and third end portions exposed from the element body on the first surface and connected to the first external electrode, the first, second, and third end portions are arranged in order in the first direction when viewed from a second direction along the first surface and orthogonal to the first direction, the first end portion and the third end portion overlap each other when viewed from the first direction at least in part, and each of the first end portion and the third end portion has a region not overlapping the second end portion when viewed from the first direction.

2. The multilayer coil component according to claim 1, wherein the second end portion includes a region not overlapping the first end portion and a region not overlapping the third end portion when viewed from the first direction.

3. The multilayer coil component according to claim 1, wherein the second end portion has a region not overlapping both the first end portion and the third end portion when viewed from the first direction.

4. The multilayer coil component according to claim 3, wherein the plurality of coil conductors include a first coil conductor including the first end portion, a second coil conductor including the second end portion, and a third coil conductor including the third end portion, and lengths of current paths of the first and third coil conductors are shorter than a length of a current path of the second coil conductor.

5. The multilayer coil component according to claim 4, wherein the first coil conductor linearly extends in a third direction intersecting the first and second directions from a connecting part where the first coil conductor and the first external electrode are connected.

6. The multilayer coil component according to claim 1, wherein the coil has a coil axis extending in the first direction, and a shortest distance between the second end portion and the coil axis is smaller than a shortest distance between the first end portion and the coil axis in the second direction.

7. The multilayer coil component according to claim 1, wherein each of the first end portion and the third end portion does not overlap the second end portion when viewed from the first direction.

8. The multilayer coil component according to claim 1, wherein the plurality of coil conductors include a first conductor group including a plurality of end portions exposed from the element body on the first surface and connected to the first external electrode, and a second conductor group including one or more end portions exposed from the element body on the second surface and connected to the second external electrode, the first conductor group includes the first end portion, the second end portion, and the third end portion, and the number of the end portions included in the second conductor group is smaller than the number of the end portions included in the first conductor group.

9. The multilayer coil component according to claim 8, wherein the number of the end portions in the second conductor group is one.

10. The multilayer coil component according to claim 1, wherein the plurality of coil conductors further include a fourth end portion exposed from the element body on the first surface and connected to the first external electrode, the first, second, third, and fourth end portions are arranged in order in the first direction when viewed from the second direction, the second end portion and the fourth end portion overlap each other in the first direction at least in part, and each of the second end portion and the fourth end portion has a region not overlapping the third end portion when viewed from the first direction.

* * * * *